US010527489B2

(12) United States Patent
Sakohira et al.

(10) Patent No.: US 10,527,489 B2
(45) Date of Patent: Jan. 7, 2020

(54) LIGHT-RECEIVING OPTICAL SYSTEM

(71) Applicant: NALUX CO., LTD., Osaka-shi, Osaka (JP)

(72) Inventors: Yosuke Sakohira, Osaka (JP); Kayoko Fujimura, Osaka (JP); Satoshi Komuro, Wako (JP)

(73) Assignee: NALUX CO., LTD., Osaka-shi, Osaka (JP)

( * ) Notice: Subject to any disclaimer, the term of this patent is extended or adjusted under 35 U.S.C. 154(b) by 75 days.

(21) Appl. No.: 15/924,808

(22) Filed: Mar. 19, 2018

(65) Prior Publication Data

US 2018/0274972 A1    Sep. 27, 2018

(30) Foreign Application Priority Data

Mar. 21, 2017 (JP) .................................. 2017-054393

(51) Int. Cl.
*G01J 1/04* (2006.01)
*G02B 26/08* (2006.01)
*G02B 3/08* (2006.01)
*G02B 5/18* (2006.01)

(52) U.S. Cl.
CPC ............. *G01J 1/0411* (2013.01); *G02B 3/08* (2013.01); *G02B 5/189* (2013.01); *G02B 26/0816* (2013.01)

(58) Field of Classification Search
CPC .......... G01J 1/0411; G01J 1/0407; G01J 1/04; G02B 3/08; G02B 3/02; G02B 3/10; G02B 5/1876; G02B 5/189; G02B 26/0816
See application file for complete search history.

(56) References Cited

U.S. PATENT DOCUMENTS

| 7,315,377 | B2* | 1/2008 | Holland | G01J 3/02 |
| | | | | 250/226 |
| 9,097,965 | B2* | 8/2015 | Imai | G02B 3/08 |
| 9,791,555 | B2* | 10/2017 | Zhu | G01S 17/08 |
| 2008/0030872 | A1* | 2/2008 | Nishioka | G02B 13/0045 |
| | | | | 359/683 |
| 2008/0130138 | A1* | 6/2008 | Katoh | G01S 7/4811 |
| | | | | 359/728 |
| 2014/0211194 | A1 | 7/2014 | Pacala et al. | |
| 2018/0274972 | A1* | 9/2018 | Sakohira | G01J 1/0411 |

* cited by examiner

*Primary Examiner* — John R Lee
(74) *Attorney, Agent, or Firm* — Squire Patton Boggs (US) LLP

(57) ABSTRACT

A light-receiving optical system includes a rotating mirror configured to rotate around a rotation axis and having a reflection plane arranged at an angle with the rotation axis; an imaging optical system having an optical axis that coincides with the rotation axis; a multifocal Fresnel lens having sections formed concentrically around the optical axis; and light-receiving elements, wherein the imaging optical system is configured such that rays of light that enter the rotating mirror are converged onto one of the sections depending on an angle of the rays with the optical axis, and the multifocal Fresnel lens is configured such that the rays reach one of the light-receiving elements, which corresponds to the one of the sections so that a light-receiving element that the rays reach is determined depending on the angle of the rays with the optical axis independently of a rotational position of the rotating mirror.

9 Claims, 12 Drawing Sheets

LIGHT-RECEIVING OPTICAL SYSTEM

TECHNICAL FIELD

The present invention relates to a light-receiving optical system that receives light for collecting information on surrounding objects.

BACKGROUND ART

An apparatus that irradiates surrounding objects with a light beam such as a laser beam and receives the reflected beam to collect information on the surrounding objects is known (US 2014/0211194A1). In such an apparatus, a light-receiving element that transforms the received light beam into an electric signal must be installed on a rotating portion. When the light-receiving element is installed on the rotating portion, the rotating portion is required to be upsized, and therefore the whole apparatus is upsized. Further, a device for transmitting the electric signal or the output of light-receiving element from the rotating portion to the outside is required so that the apparatus becomes complicated in configuration.

A light-receiving optical system for realizing a compact and simply configured apparatus that irradiates surrounding objects with a light beam such as a laser beam and receives the reflected beam to collect information on the surrounding objects has not been developed.

Patent document: US 2014/0211194A1

Accordingly, there is a need for a light-receiving optical system for realizing a compact and simply configured apparatus that irradiates surrounding objects with a light beam such as a laser beam and receives the reflected beam to collect information on the surrounding objects. The problem to be solved by the present invention is to provide a light-receiving optical system for realizing such a compact and simply configured apparatus as described above.

SUMMARY OF THE INVENTION

A light-receiving optical system according to the present invention includes: a rotating mirror that is configured to rotate around a rotation axis and is provided with a reflection plane arranged at an angle with the rotation axis; an imaging optical system having an optical axis that coincides with the rotation axis; a multifocal Fresnel lens provided with sections that are formed concentrically around the optical axis; and light-receiving elements. The imaging optical system is configured such that rays of light that enter the rotating mirror at an angle in a range of angle with the optical axis are converged onto one of the sections of the multifocal Fresnel lens depending on an angle of the rays with the optical axis, and the multifocal Fresnel lens is configured such that the rays converged onto the one of the sections reach one of the light-receiving elements, which corresponds to the one of the sections so that a light-receiving element that the rays of light reach is determined depending on the angle of the rays with the optical axis independently of a rotational position of the rotating mirror.

In the light-receiving optical system according to the present invention, the light-receiving elements are not required to rotate. Accordingly, using the light-receiving optical system according to the present invention, a compact and simply configured apparatus that irradiates surrounding objects with a light beam such as a laser beam and receives the reflected beam to collect information on the surrounding objects can be realized.

In a light-receiving optical system according to the first embodiment of the present invention, the reflection plane is arranged so as to be orthogonal to a reference plane that contains the rotation axis and a reference axis that connects the center of a measuring object and a fiducial point of the light-receiving optical system and intersects at the fiducial point with the rotation axis at an angle.

According to the present embodiment, rays of light in the reference plane and at angles in a certain range with the reference axis can be separated and directed to one of the fixed light-receiving elements.

In a light-receiving optical system according to the second embodiment of the present invention, the light-receiving optical system is configured such that the rotation axis and the reference axis are orthogonal to each other.

In a light-receiving optical system according to the third embodiment of the present invention, when a difference between the maximum value and the minimum value in angle with the optical axis of rays of light that are converged onto one of the sections is represented as $\Delta\theta$, the minimum value of the values of $\Delta\theta$ of the sections is represented as $\alpha$, the entrance pupil diameter of the imaging optical system is represented as $D$, the near point distance is represented as $L_n$ and the wavelength to be used is represented as $\lambda$, the relationships $$\alpha \geq \sqrt{4.88\lambda/L_n}$$

and $$4.88\lambda/\alpha \leq D \leq \alpha L_n$$

hold.

According to the present embodiment, the diameter of the permissible circle of confusion $\delta$ can be made the half of the width of an annular section of the multifocal Fresnel lens or less, and therefore rays entering respective annular sections can be well separated.

In a light-receiving optical system according to the fourth embodiment of the present invention, each of the sections of the multifocal Fresnel lens is in the shape of a lens provided with a continuous surfaces.

In a light-receiving optical system according to the fifth embodiment of the present invention, each of the sections of the multifocal Fresnel lens is in the shape of a Fresnel lens.

In a light-receiving optical system according to the sixth embodiment of the present invention, each of the sections of the multifocal Fresnel lens is in the shape of a lens provided with a diffraction grating.

A light-receiving optical system according to the seventh embodiment of the present invention, further includes a collective lens between the multifocal Fresnel lens and the light-receiving elements.

According to the present embodiment, light can be converged onto narrower areas by the collective lenses, and therefore an amount of light per unit area of light-receiving surfaces of the light-receiving elements can be made greater. Further, the size of light-receiving surfaces can be reduced compared with the case in which collective lenses are not used. In addition, in the case in which the light-receiving elements must be spaced a great distance apart for any other reasons, this embodiment is advantageous.

A light-receiving optical system according to the eighth embodiment of the present invention, further includes an aperture stop between the imaging optical system and the multifocal Fresnel lens.

According to the present embodiment, light unnecessary for the light-receiving optical system can be cut off when the aperture stop is made to rotate around the rotation axis in synchronization with the rotating mirror.

DESCRIPTION OF EMBODIMENTS

Figure 1:
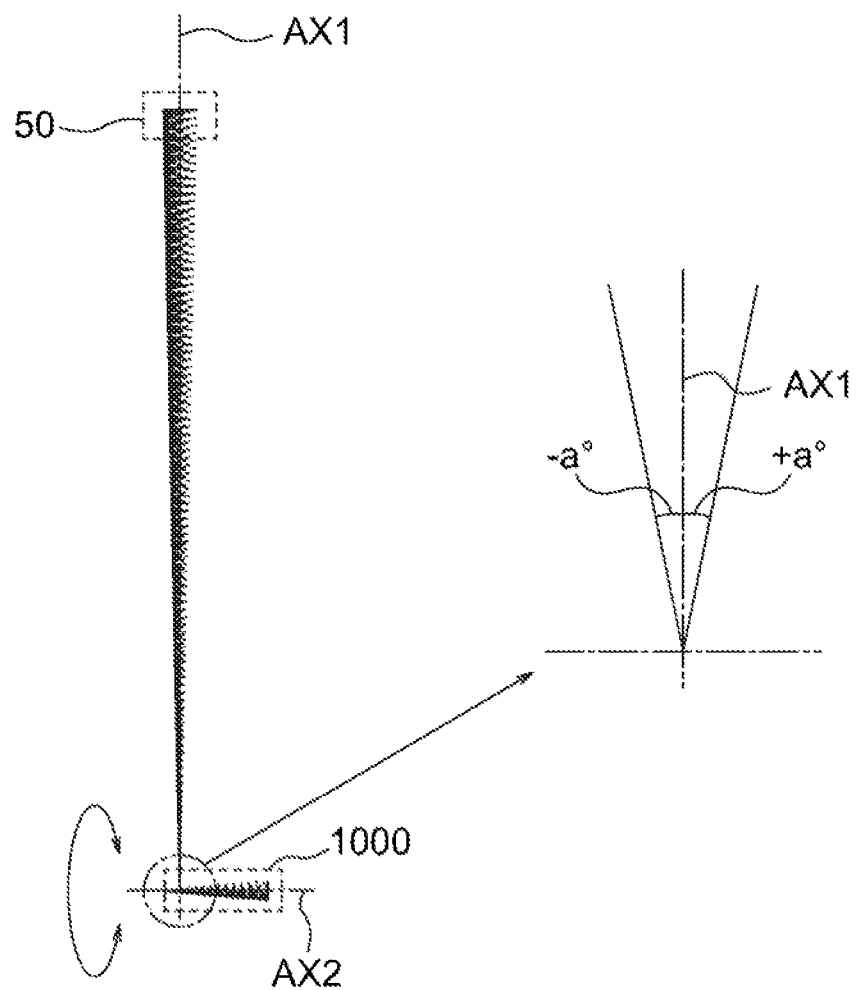
FIG. 1 shows a light-receiving optical system according to an embodiment of the present invention and a measuring object.

FIG. 1 shows a light-receiving optical system 1000 according to an embodiment of the present invention and a measuring object 50. A straight line connecting the center of the measuring object 50 and a fiducial point of the light-receiving optical system 1000 is referred to as an axis AX1. The axis AX1 is also referred to as a reference axis. A ray travelling from a point on the measuring object 50 to the light-receiving optical system 1000 is at an angle in a range of ±a° with the axis AX1. The angle is determined depending on the position of the point on the measuring object 50. The light-receiving optical system 1000 is formed along an axis AX2 that is at an angle with the axis AX1 and passes through the fiducial point. FIG. 1 shows a cross section containing the axis AX1 and the axis AX2. The plane containing the axis AX1 and the axis AX2 is referred to as a reference plane.

Figure 2:
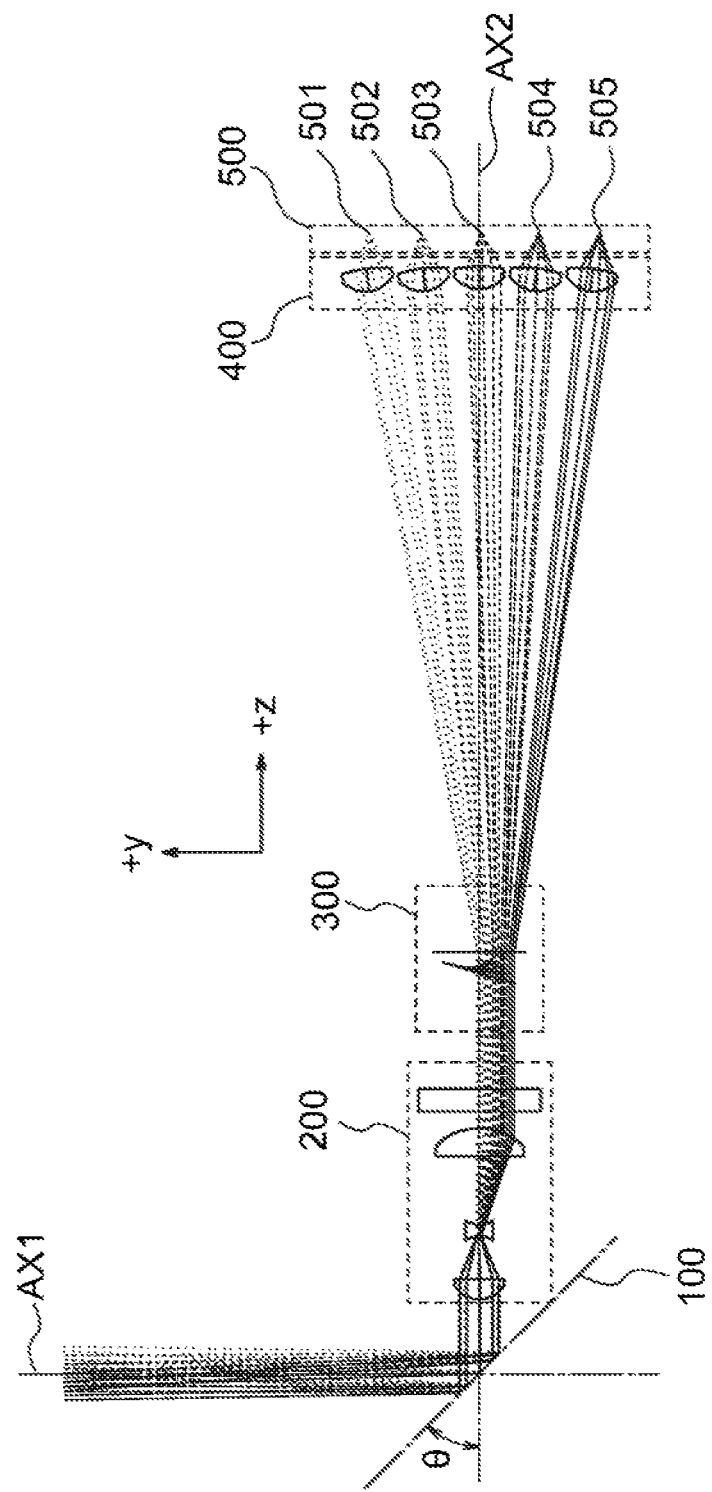
FIG. 2 shows a layout of the light-receiving optical system according to the embodiment of the present invention r.

FIG. 2 shows a layout of the light-receiving optical system 1000 according to the embodiment of the present invention. FIG. 2 shows a cross section containing the axis AX1 and the axis AX2. The light-receiving optical system 1000 shown in FIG. 2 is configured such that the axis AX1 and the axis AX2 are orthogonal to each other. In general, the angle between the axis AX1 and the axis AX2 should preferably be made in a range from 45 degrees to 135 degrees. The light-receiving optical system 1000 includes a rotating mirror 100, an imaging optical system 200, a multifocal Fresnel lens 300, a plurality of collective lenses 400 and a plurality of light-receiving elements 500. The rotating mirror 100 includes a reflection plane that is orthogonal to a plane containing the axis AX1 and the axis AX2 and is at an angle (an acute angle) θ with the axis AX2 in the plane and that is configured to rotate around the axis AX2. While the rotating mirror 100 rotates around the axis AX2, rays from measuring objects around the axis AX2 reach the light-receiving optical system 1000. The axis AX2 is the rotation axis of the rotating mirror 100 as well as the optical axis of the imaging optical system 200. The imaging optical system 200 is configured so as to converge a ray at an angle in a range of ±a° with the axis AX1 onto a surface of the multifocal Fresnel lens 300 the central axis of which is the axis AX2.

Figure 3:
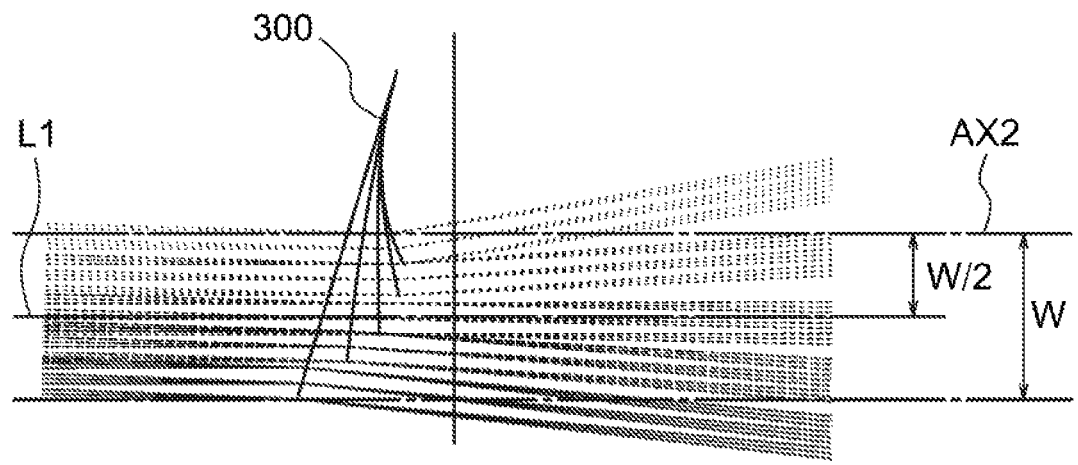
FIG. 3 illustrates how the multifocal Fresnel lens functions.

FIG. 3 illustrates how the multifocal Fresnel lens 300 functions. In FIG. 3 W represents the radius of the circle forming the outer boundary of the cross section of the multifocal Fresnel lens 300 perpendicular to the axis AX2.

Figure 4:
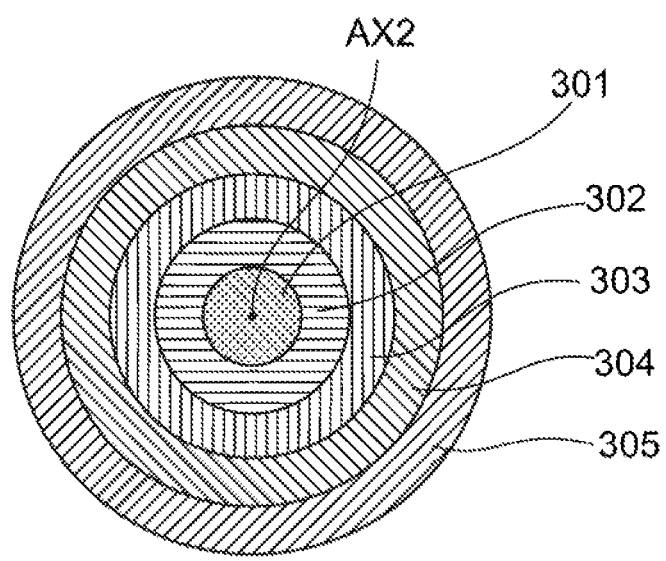
FIG. 4 shows the cross section of the multifocal Fresnel lens perpendicular to the axis AX2.

FIG. 4 shows the cross section of the multifocal Fresnel lens 300 perpendicular to the axis AX2. The multifocal Fresnel lens 300 includes a plurality of sections 301, 302, 303, 304 and 305 that are formed concentrically around the axis AX2. The plurality of sections are referred to as annular sections.

Figure 5:
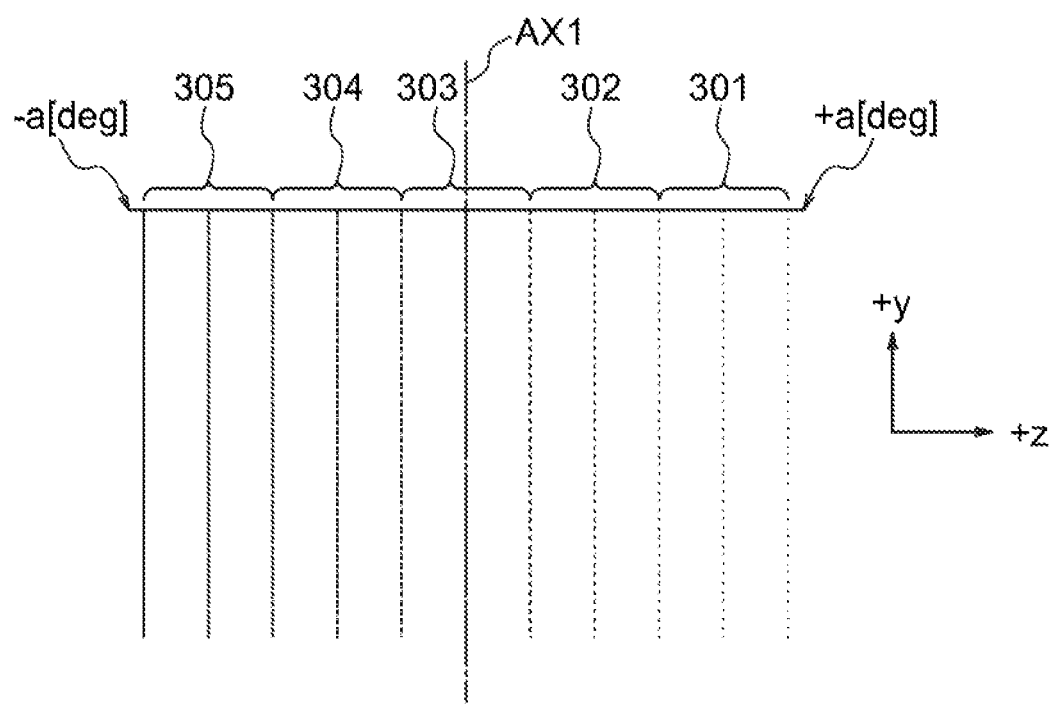
FIG. 5 shows optical paths of rays from the measuring object.

FIG. 5 shows optical paths of rays from the measuring object 50. The imaging optical system 200 is configured such that a ray L1 that travels along the axis AX1 passes through the midpoint (in the annular section 303) between the center and the periphery of the circle forming the outer boundary of the cross section of the multifocal Fresnel lens 300 perpendicular to the axis AX2. Further, the imaging optical system 200 is configured such that rays at an angle of +a° with the axis AX1 converge onto the center in the annular section 301 and rays at an angle of −a° with the axis AX1 converge onto the periphery in the annular section 305. When the rotating mirror 100 is at a certain rotational position, rays at angles from +a° to −a° with the axis AX1 converge onto a linear segment corresponding to the straight-line segment connecting the center and the periphery. When the rotating mirror 100 rotates around the axis AX2 as described later, the above-described linear segment also rotates around the axis AX2. Accordingly, a ray converges onto one of the annular sections that is determined depending on the angle with the axis AX1 of the ray, independently of a rotational position of the rotating mirror 100. In FIG. 5 reference numerals 301 to 305 represent the annular sections that respective rays reach.

The annular sections may not be identical in width size. Width size of each annular section should be determined depending on the range of angle with the axis AX1 of rays.

Figure 6:
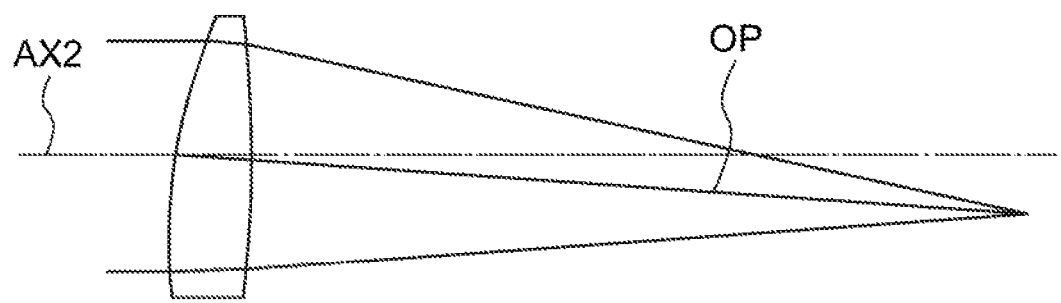
FIG. 6 illustrates a virtual lens corresponding to an annular section of the multifocal Fresnel lens.

FIG. 6 illustrates a virtual lens corresponding to an annular section of the multifocal Fresnel lens 300. The virtual lens can be realized by any of a lens with continuous surfaces such as spherical, aspherical or free-form surfaces, a Fresnel lens and a diffraction grating. The optical axis of the virtual lens is defined along the optical path of a ray travelling parallel to the axis AX2 travels after having passed through the virtual lens. Accordingly, when the optical axis of each virtual lens corresponding to each annular section is aimed at one of the light-receiving elements or one of the collective lenses, rays that are nearly parallel to the axis AX2 among the rays entering the annular section can be directed to the one of the light-receiving elements or the one of the collective lenses.

Figure 7:
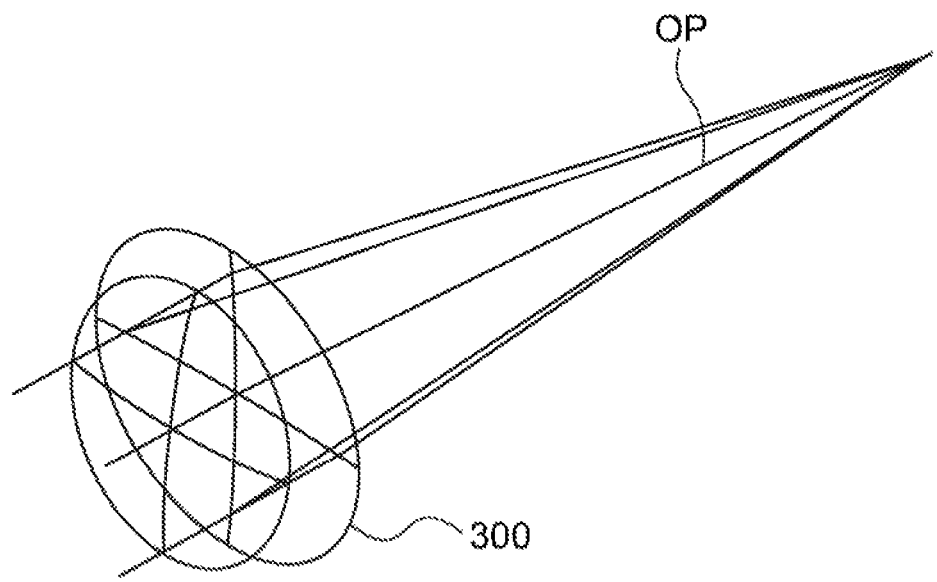
FIG. 7 shows the optical axis of a virtual lens of one of the annular sections of the multifocal Fresnel lens.

FIG. 7 shows the optical axis of a virtual lens of one of the annular sections of the multifocal Fresnel lens 300.

Figure 8:
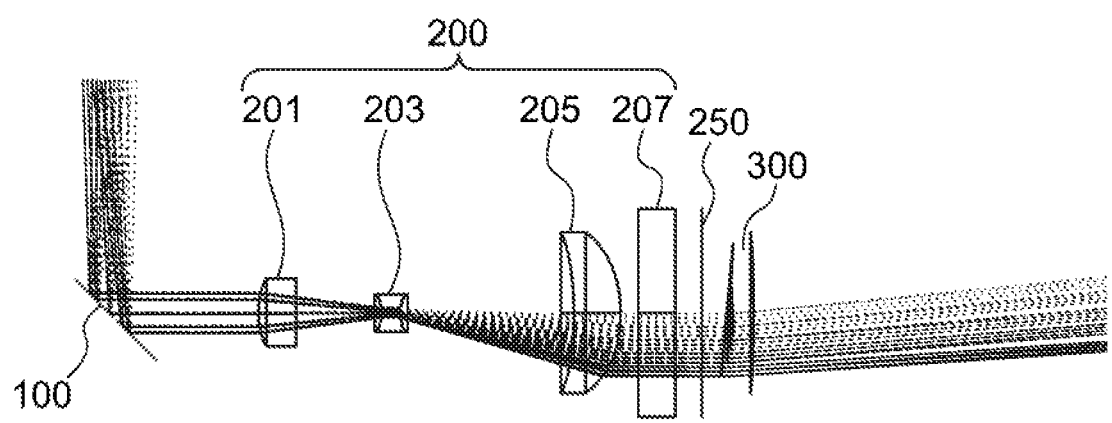
FIG. 8 shows a layout of the optical system including the rotating mirror, the imaging optical system and the multifocal Fresnel lens.

FIG. 8 shows a layout of the optical system including the rotating mirror 100, the imaging optical system 200 and the multifocal Fresnel lens 300. The imaging optical system 200 includes a first lens 201, a second lens 203, a third lends 205 and a band-pass filter 207. The band-pass filter 207 transmits light of the wavelength range to be used by the light-receiving elements alone. In general, when a multilayer band-pass filter is used, the band-pass filter should be placed at a position where incident angles of rays are relatively small, because the transmittance changes depending on the incident angle. Further, an aperture stop 250 may be provided between the band-pass filter 207 and the multifocal Fresnel lens 300.

Figure 9:
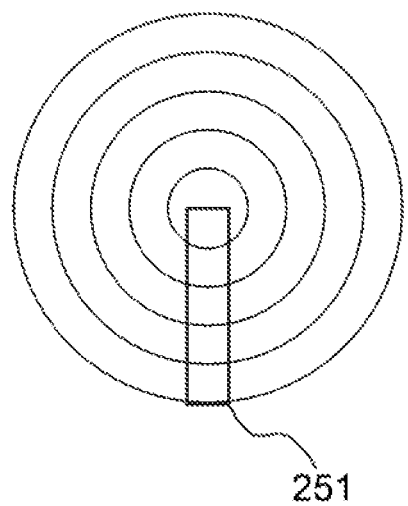
FIG. 9 shows an aperture of the aperture stop.

FIG. 9 shows an aperture 251 of the aperture stop 250.

With some illumination systems an area larger than the light-receiving area of the light-receiving optical system 1000 is illuminated. When the aperture stop 250 is placed between the imaging optical system 200 and the multifocal Fresnel lens 300 such that light necessary for the light-receiving optical system 1000 alone can pass thorough the aperture stop 250, and the aperture stop 250 is made to rotate around the axis AX2 in synchronization with the rotating mirror 100, light unnecessary for the light-receiving optical system 1000 is cut off by the aperture stop 250, and light necessary for the light-receiving optical system 1000 alone is led through the aperture stop 250 onto the light-receiving elements.

Further, the imaging optical system 200 may be made to rotate together with the rotating mirror 100. The optical axis of the imaging optical system 200 and the rotation axis coincide with the axis AX2, and therefore the function of the imaging optical system 200 remains unchanged even if the imaging optical system 200 is made to rotate. Accordingly, this configuration is advantageous when the aperture stop 250 is made to rotate.

Rotation of the rotating mirror 100 around the axis AX2 will be described below.

Figure 10:
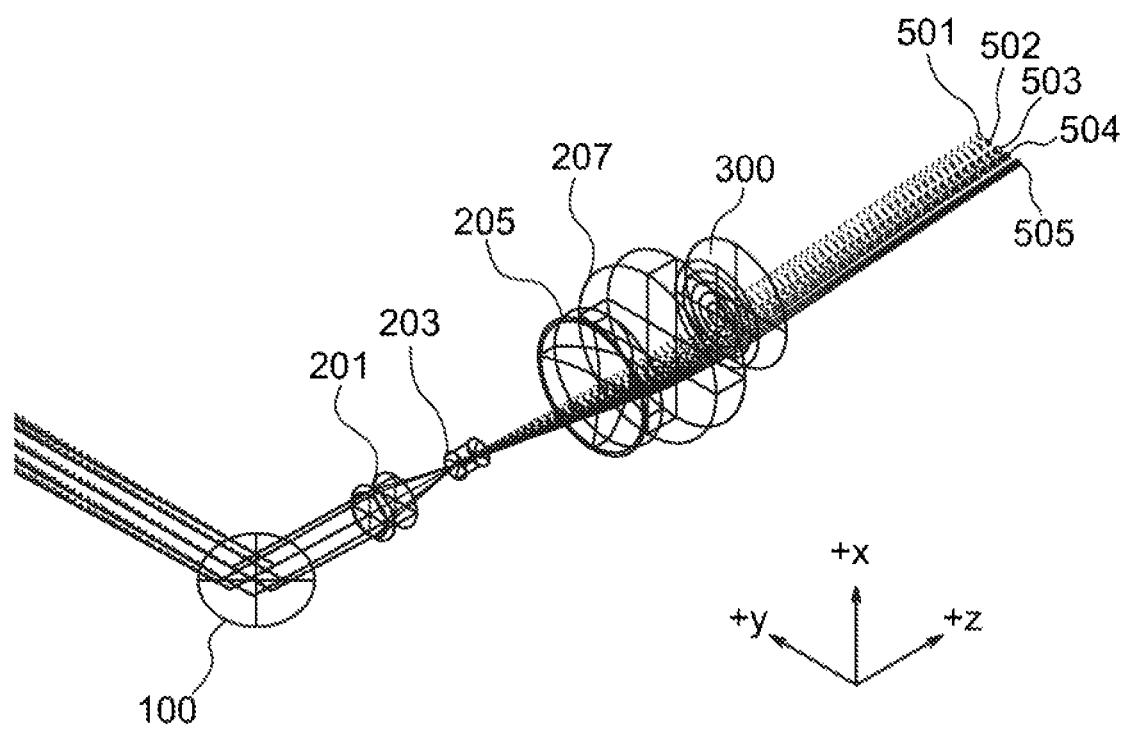
FIG. 10 shows optical paths in a light-receiving optical system without collective lenses when the rotating mirror is at a certain angle of rotation.

FIG. 10 shows optical paths in a light-receiving optical system without collective lenses when the rotating mirror 100 is at a certain angle of rotation.

Figure 11:
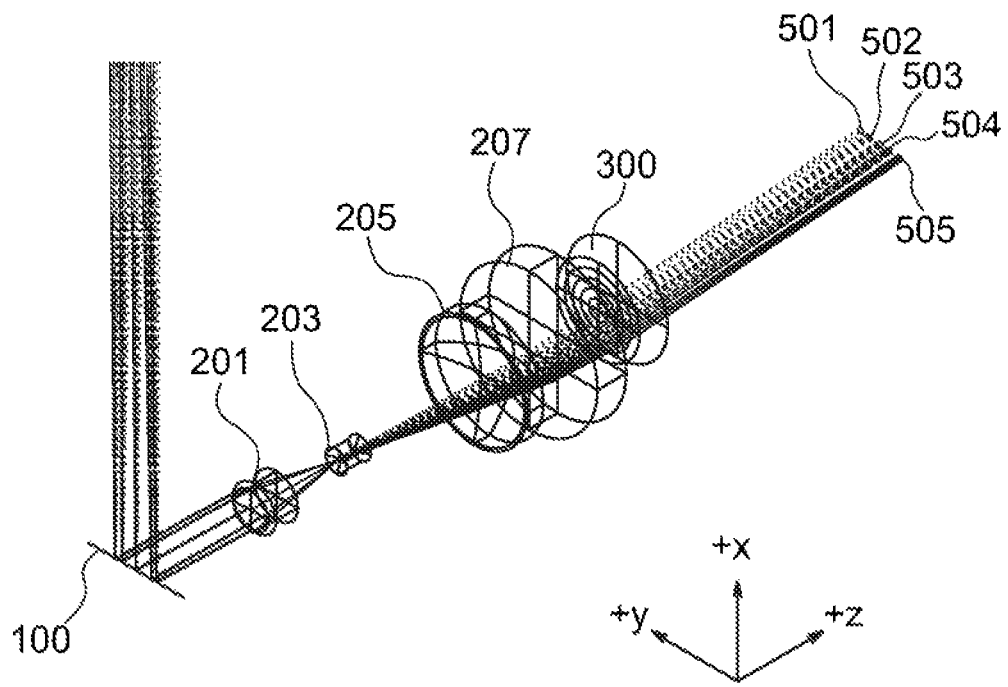
FIG. 11 shows optical paths in the light-receiving optical system without collective lenses when the rotating mirror has been rotated by 90 degrees in a clockwise direction from the state shown in FIG. 10.

FIG. 11 shows optical paths in the light-receiving optical system without collective lenses when the rotating mirror 100 has been rotated by 90 degrees in a clockwise direction from the state shown in FIG. 10.

Figure 12:
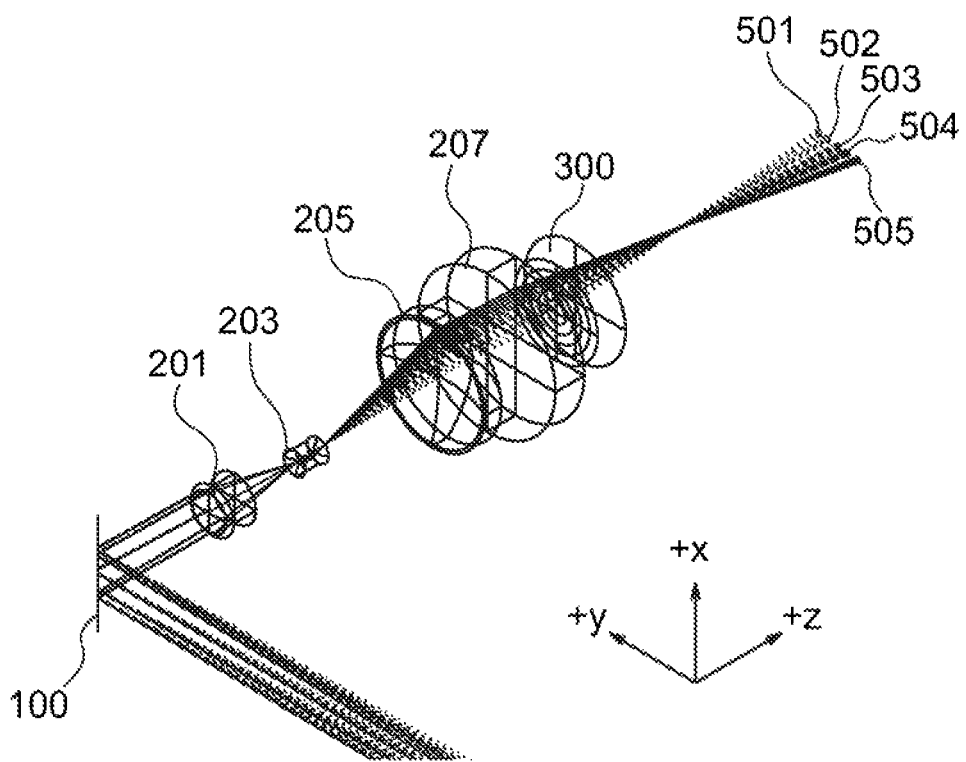
FIG. 12 shows optical paths in the light-receiving optical system without collective lenses when the rotating mirror has been rotated by 90 degrees in a clockwise direction from the state shown in FIG. 11.

FIG. 12 shows optical paths in the light-receiving optical system without collective lenses when the rotating mirror 100 has been rotated by 90 degrees in a clockwise direction from the state shown in FIG. 11.

Figure 13:
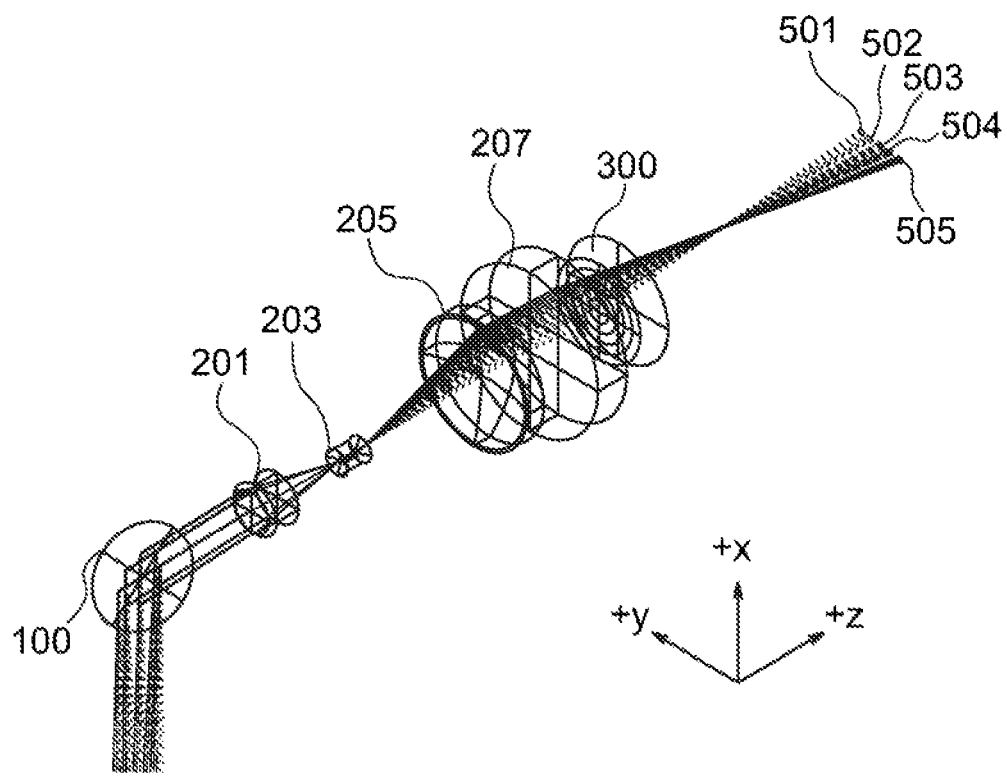
FIG. 13 shows optical paths in the light-receiving optical system without collective lenses when the rotating mirror has been rotated by 90 degrees in a clockwise direction from the state shown in FIG. 12t.

FIG. 13 shows optical paths in the light-receiving optical system without collective lenses when the rotating mirror 100 has been rotated by 90 degrees in a clockwise direction from the state shown in FIG. 12.

As shown in FIGS. 10 to 13, a ray reaches one of light-receiving elements 501 to 505, which is determined depending on the angle with the axis AX1 of the ray, independently of an angle of rotation of the rotating mirror 100.

Figure 14:
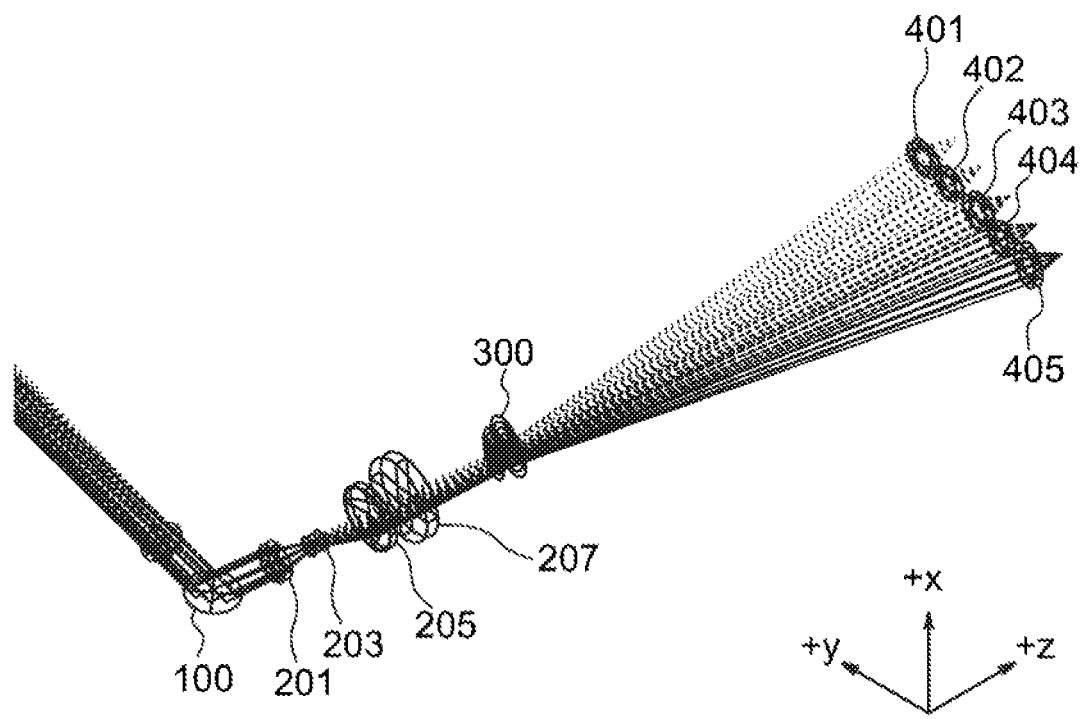
FIG. 14 shows optical paths in a light-receiving optical system with collective lenses when the rotating mirror is at a certain angle of rotation.

FIG. 14 shows optical paths in a light-receiving optical system with collective lenses 401 to 405 when the rotating mirror 100 is at a certain angle of rotation.

Figure 15:
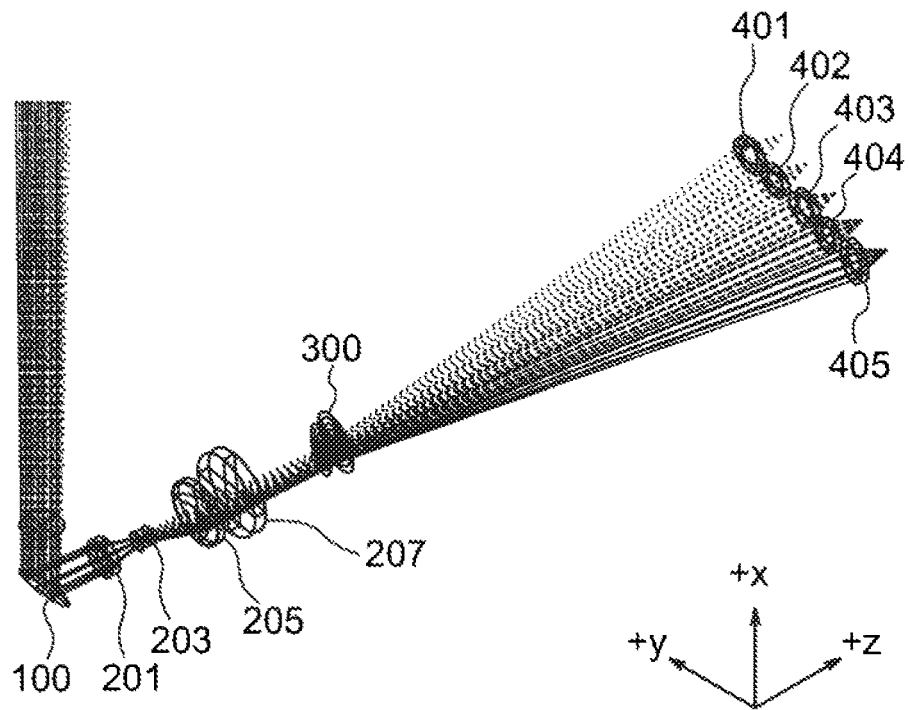
FIG. 15 shows optical paths in the light-receiving optical system with collective lenses when the rotating mirror has been rotated by 90 degrees in a clockwise direction from the state shown in FIG. 14.

FIG. 15 shows optical paths in the light-receiving optical system with collective lenses 401 to 405 when the rotating mirror 100 has been rotated by 90 degrees in a clockwise direction from the state shown in FIG. 14.

Figure 16:
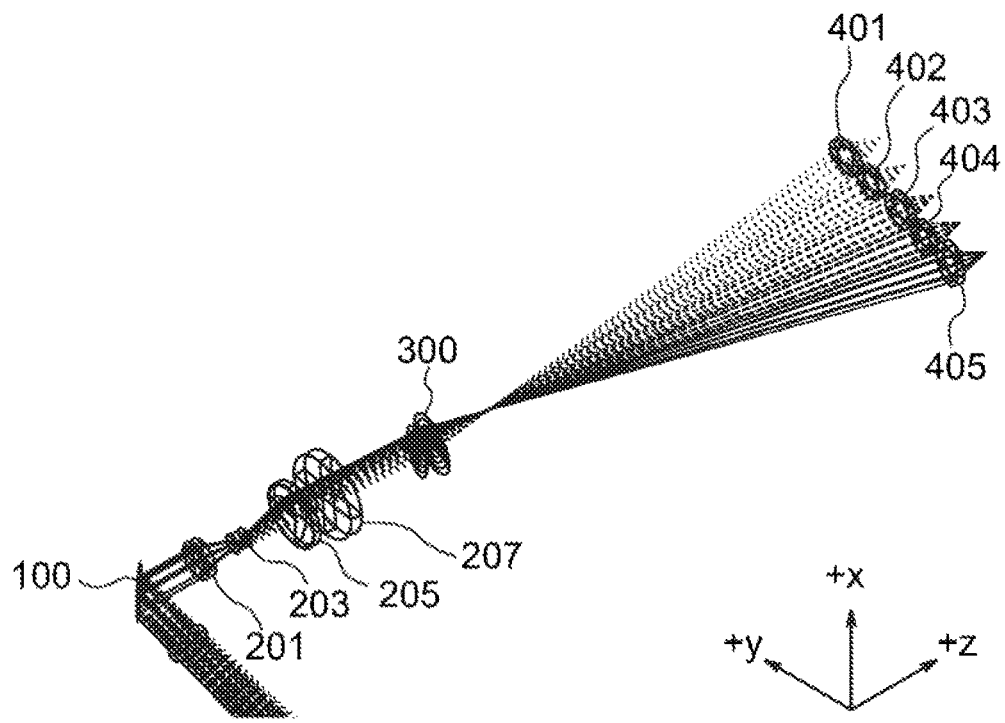
FIG. 16 shows optical paths in the light-receiving optical system with collective lenses when the rotating mirror has been rotated by 90 degrees in a clockwise direction from the state shown in FIG. 15.

FIG. 16 shows optical paths in the light-receiving optical system with collective lenses 401 to 405 when the rotating mirror 100 has been rotated by 90 degrees in a clockwise direction from the state shown in FIG. 15.

Figure 17:
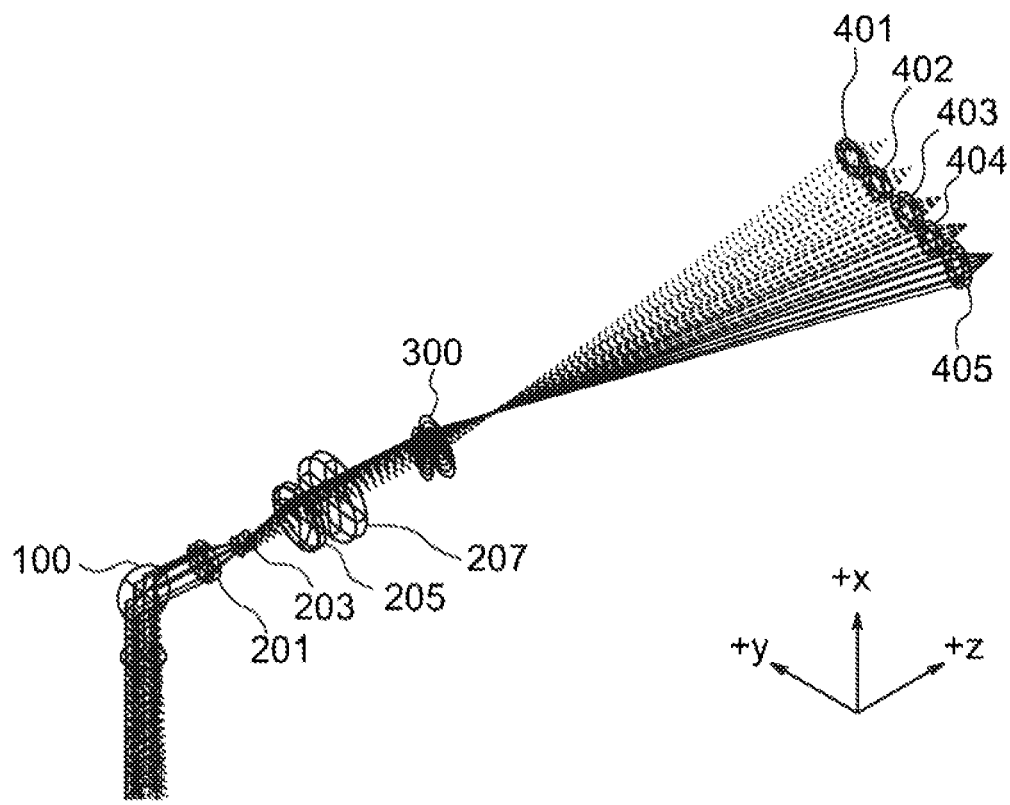
FIG. 17 shows optical paths in the light-receiving optical system with collective lenses when the rotating mirror has been rotated by 90 degrees in a clockwise direction from the state shown in FIG. 16.

FIG. 17 shows optical paths in the light-receiving optical system with collective lenses 401 to 405 when the rotating mirror 100 has been rotated by 90 degrees in a clockwise direction from the state shown in FIG. 16.

As shown in FIGS. 14 to 17, a ray reaches one of the collective lenses 401 to 405, which is determined depending on the angle with the axis AX1 of the ray, independently of an angle of rotation of the rotating mirror 100.

In summary, by an angle (in a range from −a° to +a°) with the axis AX1 of a ray travelling from the measuring object 50 and entering the light-receiving optical system 1000, an annular section of the multifocal Fresnel lens 300 that the ray enters is determined. In other words, by an angle (in a range from −a° to +a°) with the axis AX2 of the ray travelling after having been reflected by the rotating mirror 100, an annular section of the multifocal Fresnel lens 300 that the ray enters is determined. Further, rays that enter an annular section reach the light-receiving element or the collective lens that corresponds to the annular section. Thus, by an angle with the axis AX1 of a ray travelling from the measuring object 50 and entering the light-receiving optical system 1000, the light-receiving element that the ray reaches can be determined. In this case, the light-receiving element that the ray reaches is determined only by the angle of the ray with the axis AX1, independently of rotation of the rotating mirror 100. In other words, the light-receiving element that the ray reaches is determined only by the angle with the axis AX2 of the ray travelling after having been reflected by the rotating mirror 100, independently of rotation of the rotating mirror 100. Accordingly, in the light-receiving optical system 1000, the light-receiving elements is not required to rotate.

The light-receiving optical system 1000 will be described below.

First, the imaging optical system 200 will be described. The imaging optical system 200 should preferably be image-side telecentric. The reason is that in an image-side telecentric system, the image height remains unchanged even if the position of the image plane shifts in the optical axis direction, and therefore the position of a ray at the multifocal Fresnel lens 300 remains unchanged.

It is preferable that a half value of angle of view θ, an image height y and a focal length f satisfy the relationship y=fθ for simplifying design of the Fresnel lens. However, the relationship is not essential. In the specification, the relationship y=fθ is assumed to hold.

When the entrance pupil diameter is represented as D, the F-number is represented as F, the minimum angle range (a resolving power) of rays entering a single annular section is represented as α, and the annular section width corresponding to a of the multifocal Fresnel lens 300 that leads light to the light-receiving elements is represented as w, the following relationships hold.

$$w = f\alpha \quad (1)$$

$$F = f/D \quad (2)$$

The resolving power of the light-receiving optical system 1000 should preferably remain unchanged independently of whether the object is located at near distance or at far distance. In other words, the depth of field of the imaging optical system 200 is required to be sufficiently great. When the permissible circle of confusion of the imaging optical system 200 is represented as δ, the distance between the entrance pupil position and the object in the best-focused condition is represented as Lp, the rear depth of field is represented as Lr, and the front depth of field is represented as Lf, Lr and Lf can be expressed by the following equations.

$$Lr = \frac{\delta F L_p^2}{f^2 - \delta F L_p} \quad (3)$$

$$Lf = \frac{\delta F L_p^2}{f^2 - \delta F L_p} \quad (4)$$

For receiving light from far distance, the rear depth of field Lr should be made infinity. That is, the denominator of the rear depth of field Lr should be zero, and therefore the following condition should be satisfied.

$$\delta = \frac{f^2}{FL_p} \quad (5)$$

In this case, Expression (4) is expressed as Lf=Lp/2, and therefore the near point distance that is the minimum object distance under the condition that the point image is equal to or smaller than the permissible circle of confusion in size in the imaging optical system is represented as Ln, the following relation holds.

$$Ln = Lp - Lf = Lp/2$$

When the diameter δ of the permissible circle of confusion is around the half of the width of an annular section of the multifocal Fresnel lens 300, rays entering the annular section can be well separated, and therefore the following relationship should preferably be satisfied.

$$\delta \le w/2 \quad (6)$$

From Expression (1), Expression (2), Expression (5) and Expression (6), the relationship $$Lp \ge 2D/\alpha$$

is obtained, and further the following relationship holds.

$$D \le \alpha Ln \quad (7)$$

On the other hand, when the Airy disk diameter is represented as ε and the wavelength to be used is represented as λ, the following relationship holds.

$$\varepsilon = 2.44 \lambda f/D$$

Because of the interference of light waves, light cannot be converged onto an area the diameter of which is the Airy disk diameter or smaller. However, when the diameter of the Airy disk diameter ε is in the order of the diameter of the permissible circle of confusion, the diameter of the converged light spot remains substantially unchanged within the depth of field. Accordingly, the relationship $$\varepsilon \le w/2$$

should hold for separation of rays of light at the annular sectors of the multifocal Fresnel lens 300.

Accordingly, using Expression (1) and Expression (7), the following relationship should hold.

$$4.88 \lambda/\alpha \le D \le \alpha Ln \quad (8)$$

Then, the following relationship should hold for existence of the solution of D.

$$\alpha \ge \sqrt{4.88 \lambda/L_n} \quad (9)$$

When the imaging optical system 200 is configured such that Expression (9) is satisfied, rays of light can be separated by the multifocal Fresnel lens 300 depending on an angle with the axis AX1.

Next, the multifocal Fresnel lens 300 and the light-receiving elements 500 will be described. Initially, the case in which collective lenses 400 are not used will be described.

In an annular section of the multifocal Fresnel lens 300, the virtual lens should be designed such that rays of light from the imaging optical system 200 are incident onto a light-receiving element. In this case, angles of the rays of light from the imaging optical system 200 with the optical axis are in the range determined by F. When the maximum angle of the rays of light with the optical axis is represented as ß, the following relationship holds.

$$\beta = \sin^{-1}\left(\frac{1}{2F}\right) \quad (10)$$

In order that most of the rays of light that have passed through the aperture stop of the imaging optical system are converged onto a light-receiving element, the size of the light-receiving element should be great enough to cover the angle. Accordingly, when the optical path length from the focal plane of the imaging optical system to the light-receiving element is represented as Ld, the following relationship should preferably be satisfied.

$$r_d \ge L_d \tan \beta \quad (11)$$

On the other hand, in order that rays of light on an annular section are converged onto a single light-receiving element, Ld must be made greater than the maximum diameter of the annular section and should preferably be made greater than the sum of the radius W of the multifocal Fresnel lens and the distance $P_d$ between the center of the light-receiving element most distant from the optical axis and the optical axis. The reason is that with a smaller $L_d$, a tangent angle of the shape of a Fresnel lens becomes too great, and the too great tangent angle makes machining difficult. Accordingly, the following relationship should preferably be satisfied.

$$r_d \geq \frac{L_d}{\sqrt{4F^2-1}} \geq \frac{W+P_d}{\sqrt{4F^2-1}} \qquad (12)$$

Accordingly, F should preferably satisfy the following relationship.

$$F \geq \frac{1}{2}\sqrt{\left(\frac{W+P_d}{r_d}\right)^2+1} \qquad (13)$$

When the maximum value of half angle of view of the imaging optical system for receiving light is represented as $\alpha_{max}$, the following relationship holds from Expression (1) and Expression (2).

$$W = f\alpha_{max} = DF\alpha_{max} \qquad (14)$$

From Expression (13) and Expression (14), the following relationship should preferably be satisfied.

$$F = \frac{W}{D\alpha_{max}} \geq \frac{1}{2}\sqrt{\left(\frac{W+P_d}{r_d}\right)^2+1} \qquad (15)$$

Accordingly, the following relationship should preferably be satisfied.

$$D\alpha_{max} \leq \frac{2W}{\sqrt{\left(\frac{W+P_d}{r_d}\right)^2+1}} \qquad (16)$$

The case in which collective lenses 400 are used will be described below. In the case in which collective lenses are used, light can be converged onto narrower areas by the collective lenses, and therefore an amount of light per unit area of light-receiving surfaces of the light-receiving elements can be made greater. Further, the size of light-receiving surfaces can be reduced compared with the case in which collective lenses are not used. In this case, a collective lens is required for each light-receiving element, and the light-receiving elements 500 must be spaced a great distance apart in order that the collective lenses 400 corresponding to the respective light-receiving elements can be placed. Accordingly, in the case in which the light-receiving elements 500 must be spaced a great distance apart for any other reasons, the above-described arrangement with the collective lenses 400 is advantageous.

In the case in which collective lenses 400 are used, radius $r_d$ should be replaced with the maximum radius re of the collective lenses in Expression (16), and the following relationship should preferably be satisfied.

$$D\alpha_{max} \leq \frac{2W}{\sqrt{\left(\frac{W+P_d}{r_d}\right)^2+1}} \qquad (17)$$

The examples of the present invention will be described below. In the following examples, wavelength λ used for design is 1064 nm, the number of the annular sections of the multifocal Fresnel lens is five and the annular sections are identical in width. Further, the near point distance is 510 [mm].

In description of the following examples, different imaging optical systems are represented by the same reference numeral 200, and different multifocal Fresnel lenses are represented by the same reference numeral 300, for example.

Example 1

In Example 1, each of the annular sections of the multifocal Fresnel lens 300 is formed with continuous surfaces, and the light-receiving optical system is not provided with collective lenses.

The entrance pupil diameter D of the imaging optical system 200, the range of angle α of rays entering a single annular section, the maximum value $\alpha_{max}$ of half angle of view for receiving light of the imaging optical system 200, the annular section width w, the radius W of the multifocal Fresnel lens, the radius $r_d$ of the light-receiving elements and the distance $P_d$ between the center of the light-receiving element most distant from the axis AX2 and the axis AX2 are determined as below.

D=2.2 [min]
α=0.25 [deg]=4.363E-03 [rad]
$\alpha_{max}$=1.25 [deg]
w=0.6 [min]
W=3.0 [min]
$r_d$=0.25 [mm]
$P_d$=1.5 [min]

In this case, the right side of Expression (9) is 0.003191, and therefore Expression (9) is satisfied.

Further, the left side of Expression (16) is 0.048 [mm], and the right side of Expression (16) is 0.333 [mm], and therefore Expression (16) is satisfied.

The imaging optical system 200 that satisfies the above-described specification was designed as below. The distance Lp between the entrance pupil position and the object in the best-focused condition and the near point distance Ln are as below.

$Lp=2Ln=1020$ [mm]

Further, a band-pass filter 207 that transmits light of the wavelength of A was inserted between the imaging optical system 200 and the multifocal Fresnel lens 300.

Table 1 shows data of the imaging optical system 200. Unit of length in Table 1 is millimeter.

TABLE 1

| # | R | d | k | $A_4$ | $A_6$ | Refractive index |
|---|---|---|---|---|---|---|
| Object | Infinity | 1.020E+03 | 0.000E+00 | 0.000E+00 | 0.000E+00 | |
| Aperture stop | Infinity | 0 | 0.000E+00 | 0.000E+00 | 0.000E+00 | |
| 1 | 3.358E+00 | 2.000E+00 | 0.000E+00 | 2.669E-04 | 0.000E+00 | 1.521E+00 |
| 2 | 3.229E+01 | 4.700E+00 | 0.000E+00 | 4.244E-03 | 0.000E+00 | |
| 3 | -9.794E-01 | 1.000E+00 | -1.000E+00 | 9.264E-02 | 0.000E+00 | 1.521E+00 |
| 4 | 6.758E-01 | 9.364E+00 | -1.000E+00 | -6.934E-02 | 0.000E+00 | |

TABLE 1-continued

| # | R | d | k | $A_4$ | $A_6$ | Refractive index |
|---|---|---|---|---|---|---|
| 5 | −1.660E+01 | 2.500E+00 | 0.000E+00 | −7.631E−04 | −6.426E−05 | 1.521E+00 |
| 6 | −4.842E+00 | 1.000E+00 | −1.000E+00 | −7.298E−04 | −6.832E−05 | |
| BPF | Infinity | 2.000E+00 | 0.000E+00 | 0.000E+00 | 0.000E+00 | 1.450E+00 |
| | Infinity | 3.000E+00 | 0.000E+00 | 0.000E+00 | 0.000E+00 | |
| Image plane | Infinity | | 0.000E+00 | 0.000E+00 | 0.000E+00 | |

Numbers 1 to 6 in the leftmost column in Table 1 represent the entrance side and the exit side surfaces of the lens 201, the entrance side and the exit side surfaces of the lens 203 and the entrance side and the exit side surfaces of the lens 205 shown in FIG. 8, respectively. These surfaces can be expressed by the following equation when the origin of coordinates for defining each surface is defined as the point of intersection of the optical axis AX2 and the surface.

$$Z = \frac{cr^2}{1 + \sqrt{1 - (1+k)c^2 r^2}} + \sum_i A_i r^i$$

In the above-described equation, Z represents coordinate along the optical axis AX2, and the coordinate is positive on the side of the image plane. r represents distance from the optical axis AX2.

BPF in the leftmost column in Table 1 represents the band-pass filter 207.

R in the uppermost line in Table 1 corresponds to the inverse of c in the above-described equation and represents the radius of curvature at the origin of coordinates for defining the surface. k corresponds to k in the above-described equation and represents the conic constant. $A_4$ and $A_6$ represent values of $A_i$ in the above-described equation. Further, d represents distances between surfaces. For example, the value of d in the line of the object represents the distance from the object to the aperture stop, and the value of d in the line of the aperture stop represents the distance from the aperture stop to the entrance surface of the lens 201. The value of d in the line of the aperture stop is zero, and therefore the aperture stop is located on the entrance surface of the lens 201.

Table 2 shows data of the shapes of the surfaces of the annular sections of the multifocal Fresnel lens 300. Unit of length in Table 2 is millimeter.

TABLE 2

| | Annular sections | | | | |
|---|---|---|---|---|---|
| | 1 | 2 | 3 | 4 | 5 |
| R(=1/c) | 14.853 | 14.9414 | 15.04169 | 15.18156 | 15.40069 |
| k | 0 | 0 | 0 | 0 | 0 |
| $A_{00}$ | 0.152707 | 0.098094 | 0 | −0.14035 | −0.32167 |
| $A_{01}$ | −0.14688 | −0.07329 | 0 | 0.072756 | 0.1451 |
| rmin | 0 | 0.6 | 1.2 | 1.8 | 2.4 |
| rmax | 0.6 | 1.2 | 1.8 | 2.4 | 3 |

Numbers 1 to 5 in the upmost line in Table 2 represent respective annular sections that corresponds to 301 to 305 in FIG. 4.

The surface of each annular section of the multifocal Fresnel lens 300 can be expressed by the following equation. The refractive index is 1.521.

$$Z = \frac{cr^2}{1 + \sqrt{1 - (1+k)c^2 r^2}} + \sum_{m,n} A_{mn} x^m y^n \quad (r\text{min} \le r < r\text{max})$$

The point of intersection of the image plane of the imaging optical system 200 and the optical axis AX2 is defined as the origin of coordinates for defining the Fresnel surface and is made to coincide with the point of intersection of the surface of the annular section 303 and the optical axis AX2. Z in the above-described equation represents coordinate along the optical axis AX2 with respect to the origin of coordinates for defining the Fresnel surface. The coordinate is positive on the side of the light-receiving elements. r represents distance from the optical axis AX2. An x-axis and a y-axis that are orthogonal to each other are defined in the surface perpendicular to the optical axis AX2.

R in the leftmost column in Table 2 corresponds to the inverse of c in the above-described equation and represents the radius of curvature at the origin of coordinates for defining the surface. k corresponds to k in the above-described equation and represents the conic constant. $A_{00}$ and $A_{01}$ represent values of $A_{mn}$ in the above-described equation. $r_{min}$ represents the distance between the inner circular boundary of each annular section and the optical axis AX2, and $r_{max}$ represents the distance between the outer circular boundary of each annular section and the optical axis AX2.

Table 3 shows data of the shape of the surface of the multifocal Fresnel lens 300 on the side of the light-receiving elements. Unit of length in Table 3 is millimeter.

TABLE 3

| R(=1/c) | −32.000 |
|---|---|
| k | 0 |
| t | 1.5 |

R in the leftmost column in Table 3 represents the radius of curvature at the origin of coordinates for defining the surface. k represents the conic constant, and k=0 shows that the surface is spherical. t represents the distance between the origin of coordinates for defining the Fresnel surface and the origin of coordinates for defining the surface on the side of the light-receiving elements.

With the configuration described above, rays of light passing through each of the annular sections can be made to reach the corresponding one of the light-receiving elements with the radius rd=0.25 [mm] that are arranged in a straight line in the y-axis direction with an interval of 0.75 [mm] assuming that the maximum value $L_d$ of optical path length between the focal plane (the image plane) of the imaging optical system and one of the light-receiving elements is 21.508 [mm].

Figure 18:
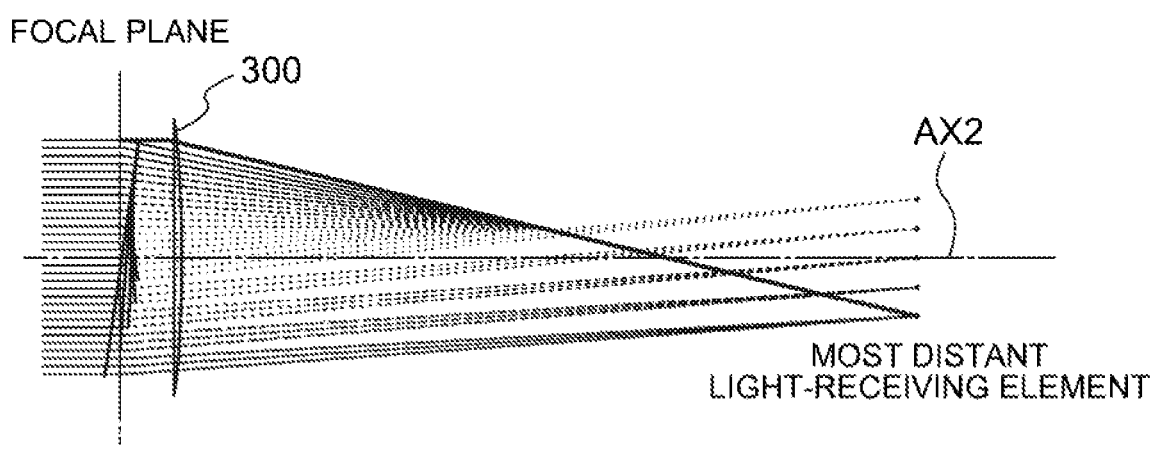
FIG. 18 shows the focal position of the imaging optical system and the most distant light-receiving element.

FIG. 18 shows the focal plane of the imaging optical system and the light-receiving element most distant from the focal plane. The optical path length from the focal plane to the light-receiving element shows the maximum value Ld.

The axis AX1 is made orthogonal to the optical axis AX2 of the imaging optical system 200, and the angle of the rotating mirror with the optical axis AX2 is set at 45.3125 [deg] such that a ray of light travelling along the axis AX1 passes through a point of the multifocal Fresnel lens 300, the point being W/2 distant from the optical axis AX2, and W being the radius of the multifocal Fresnel lens 300. In this case, a ray of light at an angle of +0.625 [deg] with the axis AX1 passes through the center of the multifocal Fresnel lens 300 after having passed through the imaging optical system 200 and travels toward the light-receiving element 501. Further, a ray of light at an angle of −0.625 [deg] with the axis AX1 passes through the outer boundary of the optical surface of the multifocal Fresnel lens 300 and travels toward the light-receiving element 505.

With the configuration described above, rays of light at an angle in a range from +0.625 [deg] to +0.375 [deg] with the axis AX1 passes through the annular section 301 of the multifocal Fresnel lens 300 and enters the light-receiving element 501. Similarly, rays of light at an angle in a range from +0.375 [deg] to +0.125 [deg] with the axis AX1 passes through the annular section 302 of the multifocal Fresnel lens 300 and enters the light-receiving element 502, rays of light at an angle in a range from +0.125 [deg] to −0.125 [deg] with the axis AX1 passes through the annular section 303 of the multifocal Fresnel lens 300 and enters the light-receiving element 503, rays of light at an angle in a range from −0.125 [deg] to −0.375 [deg] with the axis AX1 passes through the annular section 304 of the multifocal Fresnel lens 300 and enters the light-receiving element 504 and rays of light at an angle in a range from −0.375 [deg] to −0.625 [deg] with the axis AX1 passes through the annular section 305 of the multifocal Fresnel lens 300 and enters the light-receiving element 505.

Example 2

In Example 2, each of the annular sections of the multifocal Fresnel lens 300 is formed with continuous surfaces, and the light-receiving optical system is provided with collective lenses.

The entrance pupil diameter D of the imaging optical system 200, the range of angle $\alpha_{max}$ of rays entering a single annular section, the maximum value $\alpha_{max}$ of half angle of view for receiving light of the imaging optical system 200, the annular section width w, the radius W of the multifocal Fresnel lens, the radius $r_c$ of the collective lens, the radius $r_d$ of the light-receiving elements and the distance $P_d$ between the center of the light-receiving element most distant from the axis AX2 and the axis AX2 are determined as below.

D=4.0 [mm]
α=0.45 [deg]=7.8540E−03 [rad]
αmax=2.25 [deg]
w=0.66 [min]
W=3.3 [min]
$r_c$=3.0 [mm]
$r_d$=0.25 [mm]
$P_d$=12.0 [mm]

In this case, the right side of Expression (9) is 0.003191, and therefore Expression (9) is satisfied.

Further, the left side of Expression (17) is 0.157 [mm], and the right side of Expression (17) is 1.270 [mm], and therefore Expression (17) is satisfied.

The imaging optical system 200 that satisfies the above-described specification was designed as below. The distance $L_p$ between the entrance pupil position and the object in the best-focused condition and the near point distance $L_n$ are as below.

$$L_p = 2L_n = 1020 \text{ [mm]}$$

Further, a band-pass filter 207 that transmits light of wavelength of A was inserted between the imaging optical system 200 and the multifocal Fresnel lens 300.

Table 4A and Table 4B show data of the imaging optical system 200. Unit of length in Table 4A and Table 4B is millimeter.

TABLE 4A

| # | R(=1/c) | d | k | Refractive index |
|---|---|---|---|---|
| Object | Infinity | 1.020E+03 | 0.000E+00 | |
| Aperture stop | Infinity | 0.000E+00 | 0.000E+00 | |
| 1 | 3.538E+00 | 2.000E+00 | 0.000E+00 | 1.521E+00 |
| 2 | 3.129E+01 | 4.750E+00 | 0.000E+00 | |
| 3 | −1.303E+00 | 1.000E+00 | −1.000E+00 | 1.521E+00 |
| 4 | 9.775E−01 | 7.500E+00 | −1.000E+00 | |
| 5 | −8.656E+01 | 2.850E+00 | 0.000E+00 | 1.521E+00 |
| 6 | −5.214E+00 | 2.000E+00 | −1.000E+00 | |
| BPF | Infinity | 2.000E+00 | 0.000E+00 | 1.450E+00 |
| | Infinity | 1.300E+01 | 0.000E+00 | |
| Image plane | Infinity | — | 0.000E+00 | |

TABLE 4B

| # | $A_4$ | $A_6$ | $A_8$ | $A_{10}$ |
|---|---|---|---|---|
| Object | 0.000E+00 | 0.000E+00 | 0.000E+00 | 0.000E+00 |
| Aperture stop | 0.000E+00 | 0.000E+00 | 0.000E+00 | 0.000E+00 |
| 1 | 1.878E−04 | −1.077E−04 | 0.000E+00 | 0.000E+00 |
| 2 | 2.420E−03 | −1.142E−04 | 0.000E+00 | 0.000E+00 |
| 3 | −6.529E−02 | 0.000E+00 | 0.000E+00 | 0.000E+00 |
| 4 | −1.378E−01 | 4.963E−02 | 0.000E+00 | 0.000E+00 |
| 5 | 2.022E−03 | −4.370E−04 | 2.592E−05 | −4.882E−07 |
| 6 | 4.884E−04 | −1.204E−04 | 1.413E−06 | 5.959E−08 |
| BPF | 0.000E+00 | 0.000E+00 | 0.000E+00 | 0.000E+00 |
| | 0.000E+00 | 0.000E+00 | 0.000E+00 | 0.000E+00 |
| Image plane | 0.000E+00 | 0.000E+00 | 0.000E+00 | 0.000E+00 |

Numbers 1 to 6 in the leftmost column in Table 4A and Table 4B represent the entrance side and the exit side surfaces of the lens 201, the entrance side and the exit side surfaces of the lens 203 and the entrance side and the exit side surfaces of the lens 205 shown in FIG. 8, respectively.

These surfaces can be expressed by the following equation when the origin of coordinates for defining each surface is defined as the point of intersection of the optical axis AX2 and the surface.

$$Z = \frac{cr^2}{1+\sqrt{1-(1+k)c^2r^2}} + \sum_i A_i r^i$$

In the above-described equation, Z represents coordinate along the optical axis AX2, and the coordinate is positive on the side of the image plane. r represents distance from the optical axis AX2.

BPF in the leftmost column in Table 4A and Table 4B represents the band-pass filter 207.

R in the uppermost line in Table 4A corresponds to the inverse of c in the above-described equation and represents the radius of curvature at the origin of coordinates for defining the surface. k in Table 4A corresponds to k in the above-described equation and represents the conic constant. $A_4$, $A_6$, $A_8$ and $A_{10}$ in Table 4B represent values of $A_i$ in the above-described equation. Further, d in Table 4A represents distances between surfaces. For example, the value of d in the line of the object represents the distance from the object to the aperture stop, and the value of d in the line of the aperture stop represents the distance from the aperture stop to the entrance surface of the lens 201. The value of d in the line of the aperture stop is zero, and therefore the aperture stop is located on the entrance surface of the lens 201.

Table 5 shows data of the shapes of the surfaces of the annular sections of the multifocal Fresnel lens 300. Unit of length in Table 5 is millimeter.

TABLE 5

| | Annular section | | | | |
|---|---|---|---|---|---|
| | 1 | 2 | 3 | 4 | 5 |
| R(=1/c) | 127.9161 | 35.53567 | 46.36309 | 37.07233 | 47.97842 |
| k | 0 | 0 | 0 | 0 | 0 |
| $A_{00}$ | 0.295605 | 0.191438 | 0 | −0.30894 | −0.68227 |
| $A_{01}$ | −0.3013 | −0.1501 | 0 | 0.149479 | 0.298806 |
| $r_{min}$ | 0 | 0.66 | 1.32 | 1.98 | 2.64 |
| $r_{max}$ | 0.66 | 1.32 | 1.98 | 2.64 | 3.3 |

Numbers 1 to 5 in the upmost line in Table 5 represent respective annular sections that corresponds to 301 to 305 in FIG. 4.

The surface of each annular section of the multifocal Fresnel lens 300 can be expressed by the following equation. The refractive index is 1.521.

$$Z = \frac{cr^2}{1+\sqrt{1-(1+k)c^2r^2}} + \sum_{m,n} A_{mn} x^m y^n \quad (r\min \le r < r\max)$$

The point of intersection of the image plane of the imaging optical system 200 and the optical axis AX2 is defined as the origin of coordinates for defining the Fresnel surface and is made to coincide with the point of intersection of the surface of the annular section 303 and the optical axis AX2. Z in the above-described equation represents coordinate along the optical axis AX2 with respect to the origin of coordinates for defining the Fresnel surface. The coordinate is positive on the side of the light-receiving elements. r represents distance from the optical axis AX2. An x-axis and a y-axis that are orthogonal to each other are defined in the surface perpendicular to the optical axis AX2.

R in the leftmost column in Table 5 corresponds to the inverse of c in the above-described equation and represents the radius of curvature at the origin of coordinates for defining the surface. k corresponds to k in the above-described equation and represents the conic constant. $A_{00}$ and $A_{01}$ represent values of $A_{mn}$ in the above-described equation. $r_{min}$ represents the distance between the inner circular boundary of each annular section and the optical axis AX2, and $r_{max}$ represents the distance between the outer circular boundary of each annular section and the optical axis AX2.

The surface on the side of the light-receiving elements is a plane, and the distance from the origin of coordinates for defining the Fresnel surface to the origin of coordinates for defining the surface on the side of the light-receiving elements is 1.5 [mm].

Table 6 shows data of the five collective lenses corresponding to the five annular sections of the multifocal Fresnel lens 300. Unit of length in Table 6 is millimeter.

TABLE 6

| | | Collective lenses | | | | |
|---|---|---|---|---|---|---|
| | Items | 1 | 2 | 3 | 4 | 5 |
| | dz | 71.477 | 71.513 | 71.611 | 71.713 | 71.497 |
| | dy | 11.079 | 5.541 | 0.000 | −5.560 | −11.089 |
| | tx | −8.90 | −4.47 | 0.00 | 4.46 | 8.82 |
| | tc | 2.500 | 2.500 | 2.500 | 2.500 | 3.000 |
| S1 | R(=1/c) | 2.769E+00 | 2.851E+00 | 2.663E+00 | 3.653E+00 | 3.824E+00 |
| | K | −1.000E+00 | −1.000E+00 | −1.000E+00 | −1.000E+00 | −1.000E+00 |
| | A4 | 0.000E+00 | 0.000E+00 | 3.962E−08 | −4.243E−03 | −4.087E−03 |
| | A6 | 0.000E+00 | 0.000E+00 | −5.035E−09 | −2.165E−08 | 1.906E−08 |
| S2 | R(=1/c) | −1.047E+01 | −8.413E+00 | −9.815E+00 | −4.221E+00 | −3.114E+00 |
| | K | −1.000E+00 | −1.000E+00 | −1.000E+00 | −1.000E+00 | −1.000E+00 |
| | A4 | 0.000E+00 | 0.000E+00 | −2.054E−08 | −2.064E−03 | 6.082E−03 |
| | A6 | 0.000E+00 | 0.000E+00 | 3.328E−09 | 5.901E−08 | −2.020E−08 |

Numbers 1 to 5 in the upmost line in Table 6 represent respective collective lenses that corresponds to 401 to 405 in FIGS. 14 to 17.

The point of intersection of the axis AX2 and the image plane is defined as the origin, and an x-axis and a y-axis that are orthogonal to each other are defined in the image plane. The axis AX2 is defined as a z-axis.

The surface on the side of the multifocal Fresnel lens 300 of each collective lens is defined as a surface S1, and the surface on the side of the light-receiving elements of each collective lens is defined as a surface S2.

In the leftmost column in Table 6, dz represents the distance [in mm] from the image plane to the origin of coordinates for defining the surface S1 of each collective lens, dy represents the distance [in mm] from the axis AX2 to the origin of coordinates for defining the surface S1, tx represents an angle [in degree] between the central axis of each collective lens and the axis AX2 and tc represents a center thickness of each collective lens. Each collective lens is located such that the central axis coincides with the optical axis of the virtual lens of the corresponding annular section.

The surface S1 and the surface S2 can be expressed by the following equation.

$$Z = \frac{cr^2}{1 + \sqrt{1 - (1+k)c^2 r^2}} + \sum_i A_i r^i$$

In the above-described equation, Z represents coordinate along the optical axis of the virtual lens of the corresponding annular section, and the coordinate is positive on the side of the light-receiving elements. r represents distance from the optical axis.

R in the leftmost column in Table 6 corresponds to the inverse of c in the above-described equation and represents the radius of curvature at the origin of coordinates for defining the surface. k corresponds to k in the above-described equation and represents the conic constant. $A_4$ and $A_6$ represent values of $A_i$ in the above-described equation.

With the configuration described above, rays of light passing through each of the annular sections can be made to reach the corresponding one of the light-receiving elements that are arranged in a straight line in the y-axis direction with an interval of 6.0 [mm] assuming that the maximum value La of optical path length between the focal plane (the image plane) of the imaging optical system and one of the light-receiving elements is 73.572 [mm].

The axis AX1 is made orthogonal to the optical axis AX2 of the imaging optical system 200, and the angle of the rotating mirror with the optical axis AX2 is set at 45.5625 [deg] such that a ray of light travelling along the axis AX1 passes through a point of the multifocal Fresnel lens 300, the point being W/2 distant from the optical axis AX2, and W being the radius of the multifocal Fresnel lens 300. In this case, a ray of light at an angle of +1.125 [deg] with the axis AX1 passes through the center of the multifocal Fresnel lens 300 after having passed through the imaging optical system 200 and travels toward the light-receiving element 501. Further, a ray of light at an angle of −1.125 [deg] with the axis AX1 passes through the outer boundary of the optical surface of the multifocal Fresnel lens 300 and travels toward the light-receiving element 505.

With the configuration described above, rays of light at an angle in a range from +1.125 [deg] to +0.675 [deg] with the axis AX1 passes through the annular section 301 of the multifocal Fresnel lens 300 and enters the light-receiving element 501. Similarly, rays of light at an angle in a range from +0.675 [deg] to +0.225 [deg] with the axis AX1 passes through the annular section 302 of the multifocal Fresnel lens 300 and enters the light-receiving element 502, rays of light at an angle in a range from +0.225 [deg] to −0.225 [deg] with the axis AX1 passes through the annular section 303 of the multifocal Fresnel lens 300 and enters the light-receiving element 503, rays of light at an angle in a range from −0.225 [deg] to −0.675 [deg] with the axis AX1 passes through the annular section 304 of the multifocal Fresnel lens 300 and enters the light-receiving element 504 and rays of light at an angle in a range from −0.675 [deg] to −1.125 [deg] with the axis AX1 passes through the annular section 305 of the multifocal Fresnel lens 300 and enters the light-receiving element 505.

Example 3

The light-receiving optical system of Example 3 is identical with the light-receiving optical system of Example 1 except for the multifocal Fresnel lens. Each of the annular sections of the multifocal Fresnel lens of Example 3 is in the shape of a Fresnel lens. With this configuration, the amount of sag of the Fresnel surface can be reduced, and thereby the thickness of the multifocal Fresnel lens can be reduced.

Table 7 shows data of the shapes of the surfaces of the respective annular sections of the multifocal Fresnel lens 300. Unit of length in Table 7 is millimeter.

TABLE 7

| | Annular sections | | | | |
|---|---|---|---|---|---|
| | 1 | 2 | 3 | 4 | 5 |
| R(=1/c) | 10.357 | 10.391 | 10.340 | 10.422 | 10.416 |
| k | −1 | −1 | −1 | −1 | −1 |
| dy | −1.5 | −0.75 | 0 | 0.75 | 1.5 |
| rmin | 0 | 0.6 | 1.2 | 1.8 | 2.4 |
| rmax | 0.6 | 1.2 | 1.8 | 2.4 | 3 |

Numbers 1 to 5 in the upmost line in Table 7 represent respective annular sections that corresponds to 301 to 305 in FIG. 4. The pitch of the Fresnel lens of each annular section is 0.3 mm.

The surface of each annular section of the multifocal Fresnel lens 300 can be expressed by the following equation. The refractive index is 1.521.

$$Z = \frac{c\left(\sqrt{x^2 + (y - dy)^2}\right)^2}{1 + \sqrt{1 - (1+k)c^2\left(\sqrt{x^2 + (y - dy)^2}\right)^2}}$$

$$\left(r\min \leq \sqrt{x^2 + (y - dy)^2} < r\max\right)$$

The point of intersection of the image plane of the imaging optical system 200 and the optical axis AX2 is defined as the origin of coordinates for defining the Fresnel surface. Z in the above-described equation represents coordinate along the optical axis AX2 with respect to the origin of coordinates for defining the Fresnel surface. The coordinate is positive on the side of the light-receiving elements. An x-axis and a y-axis that are orthogonal to each other are defined in the surface perpendicular to the optical axis AX2.

R in the leftmost column in Table 7 corresponds to the inverse of c in the above-described equation and represents the radius of curvature at the origin of coordinates for defining the surface. k corresponds to k in the above-described equation and represents the conic constant. dy represents the distance [in mm] in the y-axis direction from the axis AX2 to the origin of coordinates for defining the surface of each annular section. $r_{min}$ represents the distance between the inner circular boundary of each annular section and the optical axis AX2, and $r_{max}$ represents the distance between the outer circular boundary of each annular section and the optical axis AX2.

The surface on the side of the light-receiving elements is a plane, and the distance from the origin of coordinates for defining the Fresnel surface to the origin of coordinates for defining the surface on the side of the light-receiving elements is 1.5 [mm].

By the above-described multifocal Fresnel lens of Example 3, the same effect as that of the multifocal Fresnel lens of Example 1 can be obtained.

Figure 19:
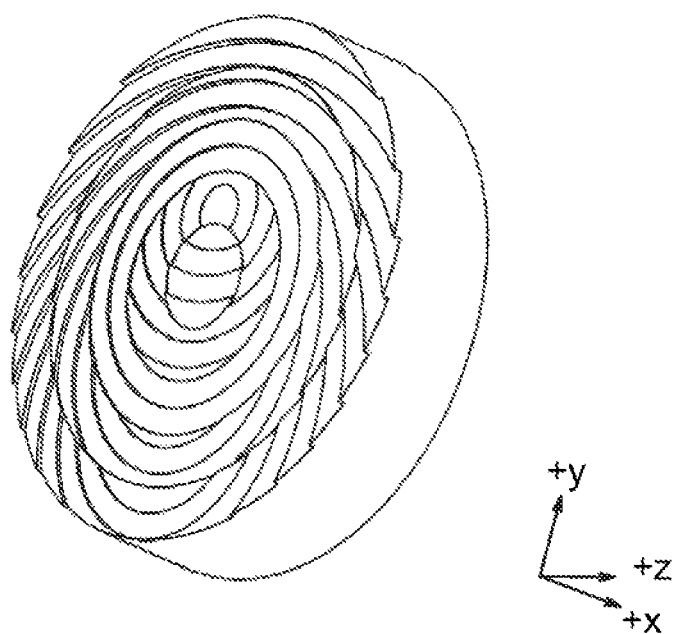
FIG. 19 shows the multifocal Fresnel lens of Example 3.

FIG. 19 shows the multifocal Fresnel lens of Example 3.

Figure 20:
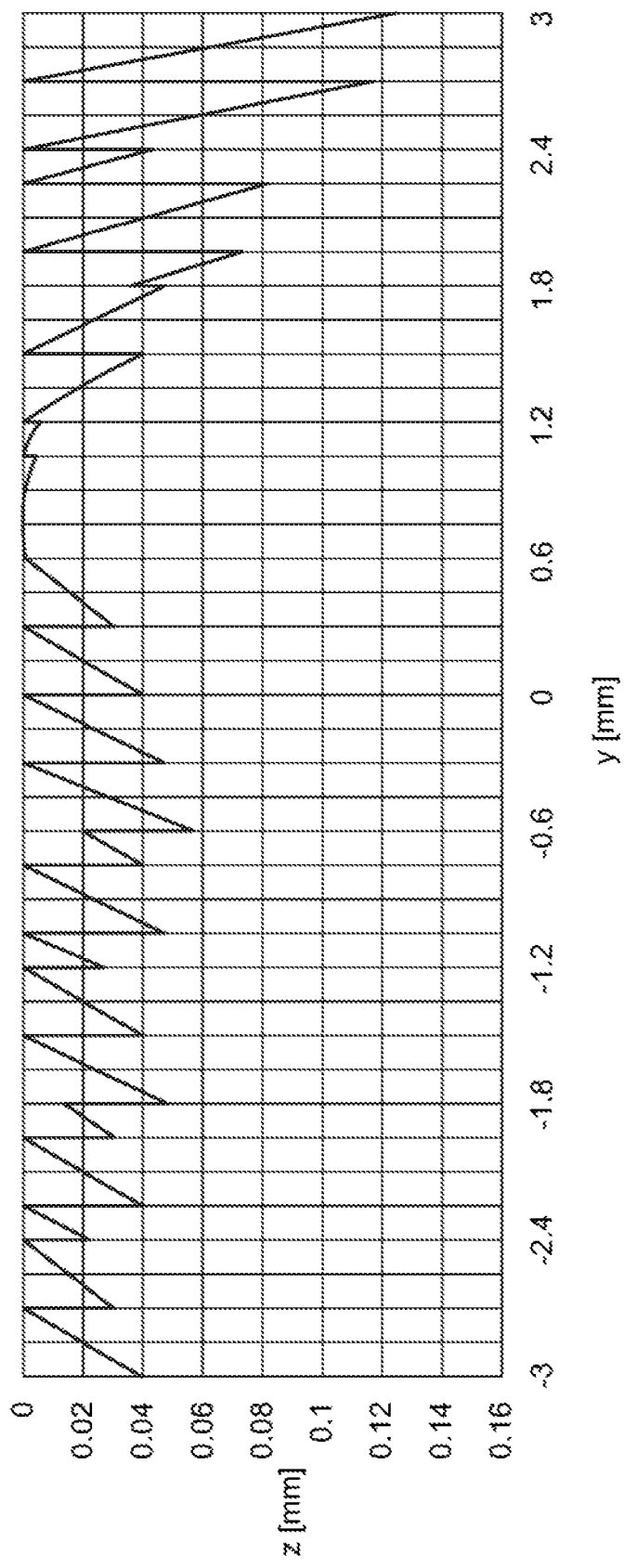
FIG. 20 shows a yz cross section of the multifocal Fresnel lens of Example 3.

FIG. 20 shows a yz cross section of the multifocal Fresnel lens of Example 3. As described above, the pitch of the Fresnel lens of each annular section is 0.3 mm. The surface of each annular section is defined such that the vertex of the surface is on the plane defining the Fresnel surface, that is, the plane that contains the origin of coordinates for defining the Fresnel surface and is perpendicular to the axis AX2.

Example 4

The light-receiving optical system of Example 4 is identical with the light-receiving optical system of Example 1 except for the multifocal Fresnel lens. Each of the annular sections of the multifocal Fresnel lens of Example 4 is formed by a diffraction grating.

Table 8 shows data of the shapes of the surfaces of the respective annular sections of the multifocal Fresnel lens 300. Unit of length in Table 8 is millimeter.

TABLE 8

| | Annular sections | | | | |
|---|---|---|---|---|---|
| | 1 | 2 | 3 | 4 | 5 |
| $B_2$ | −144.505 | −145.935 | −147.527 | −146.833 | −146.495 |
| dy | −1.5 | −0.75 | 0 | 0.75 | 1.5 |
| rmin | 0 | 0.6 | 1.2 | 1.8 | 2.4 |
| rmax | 0.6 | 1.2 | 1.8 | 2.4 | 3 |

Numbers 1 to 5 in the upmost line in Table 8 represent respective annular sections that corresponds to 301 to 305 in FIG. 4.

The phase function of each annular section of the multifocal Fresnel lens 300 can be expressed by the following equation.

$$\Phi = \sum_i B_i \left( \sqrt{x^2 + (y-dy)^2} \right)^i$$

Bi in the above-described equation represents coefficients of the polynomial. An x-axis and a y-axis that are orthogonal to each other are defined in the plane perpendicular to the optical axis AX2.

dy in the leftmost column in Table 8 represents the distance [in mm] in the y-axis direction from the axis AX2 to the origin of coordinates for defining the surface of each annular section. $r_{min}$ represents the distance between the inner circular boundary of each annular section and the optical axis AX2, and $r_{max}$ represents the distance between the outer circular boundary of each annular section and the optical axis AX2.

The surface on the side of the light-receiving elements is a plane, and the distance from the origin of coordinates for defining the Fresnel surface to the origin of coordinates for defining the surface on the side of the light-receiving elements is 1.5 [mm].

By the above-described multifocal Fresnel lens of Example 4, the same effect as that of the multifocal Fresnel lens of Example 1 can be obtained.

What is claimed is:

1. A light-receiving optical system comprising:
    a rotating mirror that is configured to rotate around a rotation axis and is provided with a reflection plane arranged at an angle with the rotation axis;
    an imaging optical system having an optical axis that coincides with the rotation axis;
    a multifocal Fresnel lens provided with sections that are formed concentrically around the optical axis; and
    light-receiving elements,
    wherein the imaging optical system is configured such that rays of light that enter the rotating mirror at an angle in a range of angles with the optical axis are converged onto one of the sections of the multifocal Fresnel lens depending on an angle of the rays with the optical axis, and
    the multifocal Fresnel lens is configured such that the rays converged onto the one of the sections reach one of the light-receiving elements, which corresponds to the one of the sections so that a light-receiving element that the rays of light reach is determined depending on the angle of the rays with the optical axis independently of a rotational position of the rotating mirror.

2. A light-receiving optical system according to claim 1, wherein the reflection plane is arranged so as to be orthogonal to a reference plane that contains the rotation axis and a reference axis that connects the center of a measuring object and a fiducial point of the light-receiving optical system and intersects at the fiducial point with the rotation axis at an angle.

3. A light-receiving optical system according to claim 2, wherein the light-receiving optical system is configured such that the rotation axis and the reference axis are orthogonal to each other.

4. A light-receiving optical system according to claim 1, wherein when a difference between the maximum value and the minimum value in angle with the optical axis of rays of light that are converged onto one of the sections is represented as $\Delta\theta$, the minimum value of the values of $\Delta\theta$ of the sections is represented as $\alpha$, the entrance pupil diameter of the imaging optical system is represented as D, the near point distance is represented as Ln and the wavelength to be used is represented as $\lambda$, the relationships $$\alpha \geq \sqrt{4.88\lambda/L_n}$$

and $$4.88\lambda/\alpha \leq D \leq \alpha L_n$$

hold.

5. A light-receiving optical system according to claim 1, wherein each of the sections of the multifocal Fresnel lens is in the shape of a lens provided with a continuous surfaces.

6. A light-receiving optical system according to claim 1, wherein each of the sections of the multifocal Fresnel lens is in the shape of a Fresnel lens.

7. A light-receiving optical system according to claim 1, wherein each of the sections of the multifocal Fresnel lens is in the shape of a lens provided with a diffraction grating.

8. A light-receiving optical system according to claim 1, further comprising a collective lens between the multifocal Fresnel lens and the light-receiving elements.

9. A light-receiving optical system according to claim 1, further comprising an aperture stop between the imaging optical system and the multifocal Fresnel lens.

* * * * *